March 10, 1931.  H. YOKOYAMA  1,795,385
STRAND LEADING-OUT DEVICE FOR NET MAKING MACHINES
Filed Dec. 21, 1929
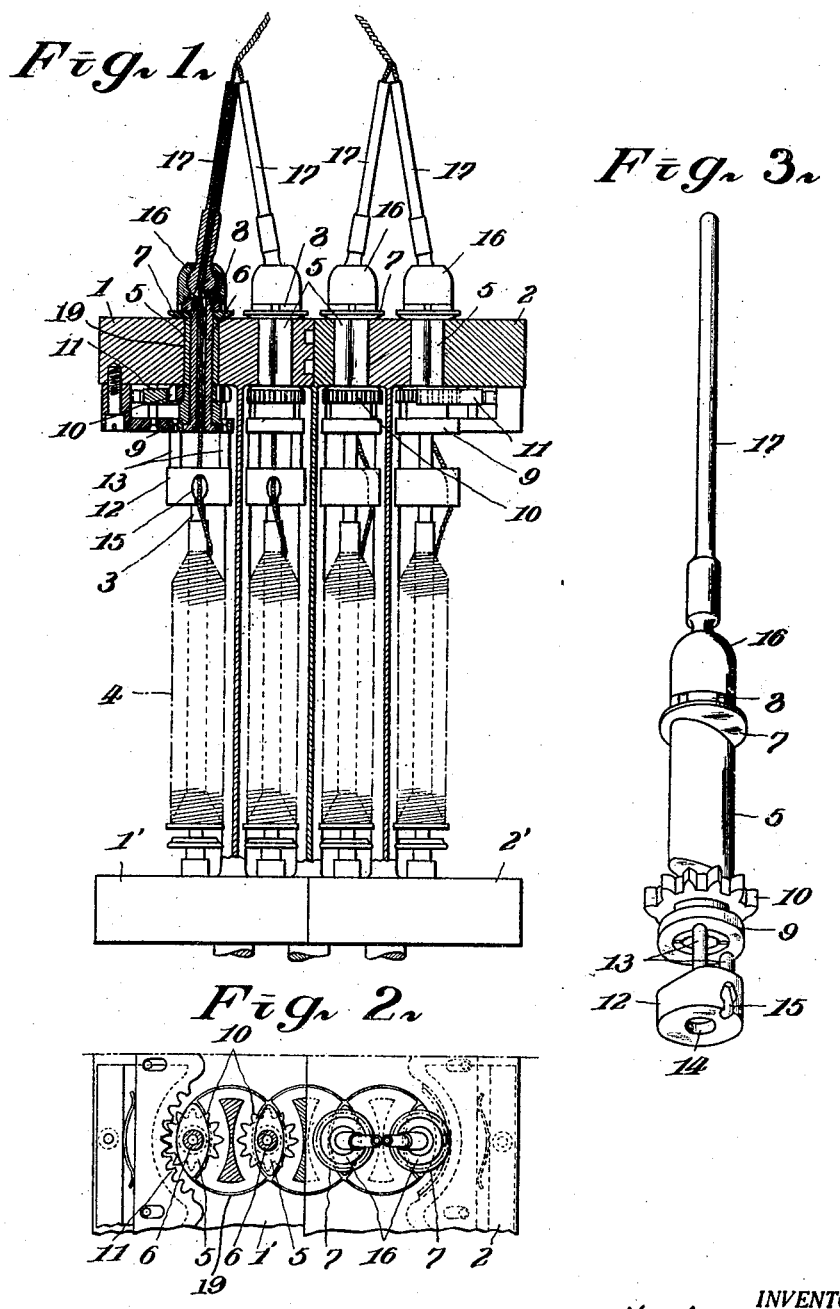
INVENTOR:
H. Yokoyama
BY
ATTORNEYS.

Patented Mar. 10, 1931

1,795,385

UNITED STATES PATENT OFFICE

HIDESUKE YOKOYAMA, OF HIROSHIMA-KEN, JAPAN

STRAND-LEADING-OUT DEVICE FOR NET-MAKING MACHINES

Application filed December 21, 1929, Serial No. 415,686, and in Japan January 7, 1929.

This invention relates to a strand leading-out device for use in the knotless-net-making machine of such a kind as disclosed in British Patent No. 153,492 and has for its object to provide a device for leading out the strands smoothly, in any desired direction from a spool to a position where the doubling or interlocking of strands may be effected over the working platform, the strand being previously twisted.

In known machines, the strands for making the net can not be smoothly and uniformly drawn out from the spools, so that the strands are not uniformly doubled. In order to eliminate this disadvantage, the invention is designed to draw out uniformly the strands from the spools over the working platform and to twist the strands before doubling or interlocking of the strands, a modification being made in the construction of known machines.

The full details of the machines are not shown and described herein, as these are well known and it will suffice to state in what manner the device according to the invention may be applied to the machines.

In the accompanying drawings:

Fig. 1 is an end view of the devices carried by the working platform of the machine, partly in section.

Fig. 2 is a plan view of Fig. 1, partly in section.

Fig. 3 is a perspective view of the device with the working head thereon.

Referring to the drawings, 1 and 2 denote the fixed half portion called stationary plate and the movable half portion called reciprocating plate respectively of the upper platform of the working platform of the machine, 1' and 2' the corresponding plates respectively of the lower platform, 3 the spindle for the spool 4, and 5 the working head inserted in the working groove 19 in the upper platform.

The hollow shaft 6 extends through the working head 5, and is mounted on the platform by means of the washer 7 and the nut 8 screwed on its reduced and threaded upper projected end. The lower end of the hollow shaft projects downwardly through the upper platform and is provided at its extreme lower end with a circular flange on which the circular disc 9 having a hub, is rotatably mounted, encircling the lower end of said hollow shaft 6. Secured to the hub of the circular disc 9 is a pinion 10 which meshes with the arc-shaped rack 11 arranged below and mounted on the working platform by suitable means, so that the circular disc 9 may be rotated, when the working head 5 is turned around in the working groove 19. The circular disc 9 carries the block 12, by means of the rods 13, 13, said block being provided at its lower portion with a central opening 14 for receiving the upper end of the spindle 3 of the spool 4, and having a groove 15, formed upwards along its circumferential surface from the bottom for the greater portion of its height and thence slopewise and upwards and opening at the top of said block 12. Over the nut 8, supporting the hollow shaft 6, is screwed at its reduced and threaded upper portion the socket 16 which receives the ball-shaped lower end of the strand-leading tube 17 to form a ball-and-socket joint.

With this construction, it will be evident that the strand will lead out from the spool 4 to the doubling or the interlocking position of it through the groove 15 in the block 12, the hollow shaft 6 and the strand-leading tube 17, and that the strand will be twisted prior to the doubling of it by means of the circular disc 9 carrying the block 12 and the action of the pinion 10 engaging the arc-shaped rack 11 when the working head 5 is turned around in the working groove 19 in the upper working platform, and that the strand will smoothly lead out through the strand-leading tube 17, and assume any desired direction through the means of the ball-and-socket joint.

With reference to the twisting of the strand prior to the doubling of it, it is seen that when the working head 5 is revolved in the working groove 19, that the pinion 10 engages the arc-shaped rack 11, and the latter being stationary on the upper platform turns the pinion 10 in a reverse direction to direction of working head 5 and with it the circular disc 9 on which the pinion is fixedly mounted and block 12, which last is fixedly connected to the disc 9 by means of the rods 13, 13. It is evident that the single strand which leads from spool 4 up through the working head 5 and part 17 to the doubling point is held substantially against twisting motion at said point by its engagement with the second strand which it meets thereat. When the block 12 revolves, the groove 15 which is eccentrically positioned with reference to the center of the block, and the center of the hollow shaft carries the single strand with it. The groove 15 when in motion describes a path which is circular, and some distance from the center of the hollow shaft 6. The strand is held against torsion at its doubling point as before explained, while its lower end describes a circular path in the groove 15, which causes the strand to become twisted between the point of entry in the groove 15 in block 12 and its point of doubling with a second strand, near its exit at the upper end of the strand-leading tube 17. Also as is readily seen in the drawings the path of the strand from groove 15 up through the hollow shaft 6, through the strand-leading tube 17 is always a comparatively open one wherein the strand has freedom of movement thus preventing the formation of knots, and this is particularly true on account of the universal or swingable joint used between the hollow shaft 6 and strand-leading tube 17. It is readily seen also that where two strands meet and are joined as at the doubling point of Figure 1, and two of the working heads of the machine are revolving in the working platform there will be some irregularity of motion, and this makes it particularly desirable to have the strands leading up from the spools through the hollow shafts, and strand-leading tubes move freely at their exit points hence the advantages of the swingable joints used in connection with the other features of my invention.

Having now described and ascertained the nature of my said invention and in what manner the same is to be performed, I claim:

1. In a strand-leading out device for net-making machines, an upper working platform and an arc-shaped rack mounted thereon, a working head revolubly mounted in the working platform and having a hollow strand-carrying shaft therein, a swingable strand-leading tube connected with the working head, a circular disc and a pinion thereon adapted to engage the arc-shaped rack, a block rigidly carried on the circular disc having an eccentrically disposed strand carrying groove therein, adapted to twist the strand between the point of its entry into said groove, and its point of exit from the strand-leading tube, when the working head is revolved.

2. In a strand-leading out device for net-making machines, a working head having a hollow shaft therethrough, a circular disc mounted on the shaft, a pinion on the disc, a block integrally mounted on the circular disc, having a strand-bearing groove eccentrically positioned therein, and a strand-leading tube, swingably connected to the hollow shaft for promoting free passage of the strand through the device.

3. In a strand-leading out device for net-making machines, an upper platform, an arc-shaped rack carried thereon, a working head revolubly mounted in the platform having a hollow strand-bearing shaft therein, a strand-leading tube swingably connected to the hollow shaft, a circular disc on the end of the hollow shaft, a pinion fixedly mounted on the disc, adapted to engage the rack for revolving the disc in a direction counter to the direction of revolution of the working head, a block rigidly mounted on the disc, having an eccentrically disposed groove therein for twisting the strand when the pinion is operated by its contact with the rack.

In testimony whereof I affix my signature.

HIDESUKE YOKOYAMA.